United States Patent
Bates et al.

(10) Patent No.: US 6,764,980 B2
(45) Date of Patent: Jul. 20, 2004

(54) COATED PRODUCTS AND USE THEREOF IN OIL FIELDS

(75) Inventors: Christopher Ian Bates, Waterloo (BE); Ian Ralph Collins, Middx (GB); Paul Derek Ravenscroft, Windsor (GB)

(73) Assignee: BP Exploration Operating Company Limited, London (GB)

(*) Notice: Subject to any disclaimer, the term of this patent is extended or adjusted under 35 U.S.C. 154(b) by 183 days.

(21) Appl. No.: 10/092,423

(22) Filed: Mar. 7, 2002

(65) Prior Publication Data

US 2002/0128157 A1 Sep. 12, 2002

Related U.S. Application Data

(62) Division of application No. 09/201,723, filed on Nov. 30, 1998, now Pat. No. 6,380,136.

(30) Foreign Application Priority Data

May 31, 1996 (GB) .............................................. 9611422

(51) Int. Cl.[7] .................................................. C09K 7/00
(52) U.S. Cl. .................. 507/90; 507/902; 507/901; 507/244; 507/224; 507/229; 507/261; 507/227; 507/939; 507/906; 507/219
(58) Field of Search ........................ 507/90, 901, 902, 507/219, 244, 224, 227, 229, 261, 906, 939

(56) References Cited

U.S. PATENT DOCUMENTS

| | | | |
|---|---|---|---|
| 2,836,555 A | 5/1958 | Armentrout |
| 3,676,363 A | 7/1972 | Mosier |
| 4,456,067 A | 6/1984 | Pinner |
| 4,770,796 A | 9/1988 | Jacobs |
| 4,919,209 A | 4/1990 | King |
| 4,986,353 A | 1/1991 | Clark et al. |
| 4,986,354 A | 1/1991 | Cantu |
| 5,092,404 A | 3/1992 | Falk et al. |
| 5,102,558 A | 4/1992 | McDougall |
| 5,437,331 A | 8/1995 | Gupta et al. |
| 5,922,652 A | 7/1999 | Kowalski et al. |
| 6,135,207 A | 10/2000 | Zaid et al. |

FOREIGN PATENT DOCUMENTS

| | | |
|---|---|---|
| GB | 2 081 278 A | 2/1982 |
| GB | 2 213 175 | 8/1989 |
| WO | WO 93 22537 A | 11/1999 |

*Primary Examiner*—Philip C. Tucker
(74) *Attorney, Agent, or Firm*—Nixon & Vanderhye

(57) ABSTRACT

An oil field production chemical, especially a scale inhibitor, is in the form of particles thereof carrying a coating e.g. of a dispersing agent. The coating may be polymeric such as an oligomeric polyacid polyester, a polymeric alkoxylated alcohol or a fatty acid polyamine condensate or it may also be a surfactant and may be used in the form of a suspension in an inert oil, such as diesel oil or kerosene which may be injected into a subterranean formation to inhibit the formation of deposits, e.g. scale in oil wells over a longer period than compounds free of the coating.

16 Claims, No Drawings

COATED PRODUCTS AND USE THEREOF IN OIL FIELDS

This application is a division of serial number 09/201,723 filed November 30, 1998, now U.S. Pat. No. 6,380,136 which is a continuation part of PCT/GB 97/01466 filed May 29, 1997.

This present invention relates to oil field production chemicals in particular scale inhibitors and their use.

Scale inhibitors are used in production wells to stop scaling in the formation and/or in the production lines down hole and at the surface. Scale is a slightly soluble inorganic salt, such as barium or strontium sulphate, calcium carbonate, calcium sulphate or calcium fluoride. In the production of hydrocarbons from these subterranean formations the deposition of scale on surfaces and production equipment is a major production problem. Scale build-up decreases permeability of the formation, reduces well productivity and shortens the lifetime of production equipment. In order to clean scaled-up wells and equipment it is necessary to stop the production i.e. by killing the well which is time-consuming and costly To minimise scale build-up an aqueous solution of a scale inhibitor is injected by force into the formation via a production well-bore. A known scale inhibitor used in such treatments include polyvinyl sulphonate.

After injection the production well is shut-in during which time the scale inhibitor is absorbed within the formation and the inhibitor is slowly desorbed into the fluids in the formation to inhibit scale deposition. After the shut-in period the production well is returned on stream. The fluids produced therefrom are analysed to determine the scale-inhibitor concentration. When the concentration of inhibitor in the fluids has reduced to a certain level then further treatments will be required. An aqueous-based scale inhibitor such as polyvinyl sulphonate has a short lifetime of a few weeks. The continual need for such treatments is therefore costly, not only in terms of production shut down periods but also in the cost of the chemical scale inhibitor used.

Other inhibitors are used in production well environments to stop other deposits e.g. wax or asphaltene and these too need shut-ins to enable the amounts of deposits to be reduced.

It has now been found that coating solid inhibitors, in particular scale inhibitors, can significantly extend the lifetime of the inhibitor thereby increasing the cost effectiveness of inhibitor treatments.

Accordingly the present invention relates to an oil field production chemical in the form of particles each carrying a coating, usually of a dispersing agent.

Another aspect of the invention provides a suspension of the coated particles of the invention in an inert oil Yet another aspect of the invention provides a process for the manufacture of an oil field production chemical in the form of particles carrying a coating wherein a solid particulate oil field production chemical is comminuted in the presence of a dispersion of a coating agent in an oil, in particular after the solid particulate chemical has been obtained by spray drying a solution thereof.

In particular the invention also provides for a method of reducing the formation of a separate phase from a liquid phase in a subterranean environment producing oil, or removing said separate phase, which comprises injecting particles comprising an oil field production chemical carrying a coating of this invention into said environment and preferably releasing said chemical into said liquid phase.

The oil field production chemical is usually a charged compound e.g. an organic or inorganic salt, but may be a polar compound especially a polar organic compound. The chemical may be anionic, cationic, neutral or nonionic. Preferably, it is a solid or may be a liquid adsorbed into or onto a solid. Usually it is an inhibitor of deposition of solids, e.g. wax, asphaltenes or scale or of the growth of solids e.g. a scale inhibitor.

The scale inhibitor may be any suitable scale inhibitor used for the purpose of inhibiting scale deposition in well bore formations. It may be a water soluble organic molecule with at least 2 carboxylic and/or phosphonic acid and/or sulphonic acid groups e.g. 2–30 such groups. Preferably the scale inhibitor is polymeric, or may be monomeric with at least one hydroxyl group and/or amino nitrogen atom, especially in a hydroxycarboxylic acid or hydroxy or amino phosphonic or sulphonic acid. Examples of such compounds are aliphatic phosphonic acids with 2–50 carbons, such as hydroxyethyl di phosphonic acid, and aminoalkyl phosphonic acids, e.g. optionally hydroxy substituted poly amino methylene phosphonates with 2–10 N atoms e.g. each bearing at least one methylene phosphonic acid group; examples of the latter are ethylene diamine tetra (methylene phosphonate), diethylene triamine penta (methylene phosphonate) and preferably the polyalkylene triamine and tetramine poly methylene phosphonates with 2–4 methylene groups between each N atom, at least 2 of the numbers of methylene groups in each alkylene being different (e.g. as described further in EP479462, the disclosure of which is herein incorporated by reference). Other scale inhibitors are polycarboxylic acids such as lactic, or tartaric acids, and polymeric anionic compounds such as polyvinyl sulphonic acid and poly(meth)acrylic acids and copolymers thereof, especially with 10-90:90-10 molar ratio of structural vinyl sulphonic groups to acrylic acid, optionally with at least some phosphonyl or phosphinyl groups as in phosphinyl polyacrylates. The scale inhibitors may be in the form of their free acids but are usually at least partly in the form of their alkali metal e.g. Na salts.

The inhibitor is used in the suspension in the form of solid particles having a particle size sufficiently small that the particles disperse in the oily continuous phase. If the particles are too large they will tend to settle out and potentially lead to agglomeration problems. The particle size may be 100% less than 10 microns, preferably 100% less than 7 microns and especially 100% less than 5 microns. Preferably the particle size is not less than 25 nanometers and advantageously not less than 200 nanometers. The average particle size is usually between 1 and 3 microns.

The inhibitors are usually obtained in aqueous solutions; these are dried. Suitable methods of drying include, but are not limited to, spray drying, to obtain a fine powder e.g. of 25–250 microns. The powder then may then, if required, be comminuted using any suitable technique, for example, jet-milling or ball-milling, e.g. wet-milled to obtain particles of the required size e.g. less than 20 microns. Other suitable comminution techniques are described in Section 8 Perry's Chemical Engineers Handbook, 4th Edition, 1963.

The inhibitors may also be obtained as liquids adsorbed into or onto a solid. Usually the solid may be an inert particulate carrier which may be inorganic e.g. silica, alumina or salt or it may be organic e.g. a naturally occurring polymer e.g. starch or a synthetic polymer e.g. a polyurethane or a polyamide. The solid may, if required, be comminuted to obtain particles of the required size using any suitable technique, for example, jet-milling or ball-milling, e.g. wet-milled. Other suitable comminution techniques are described in Section 8 Perry's Chemical Engineers Handbook, 4th Edition, 1963.

The specific gravity of the solid inhibitor may be 0.8–2.0 e.g. 1.0–1.5 while the specific gravity of the solid carrying the inhibitor may be 0.8–3.0, e.g. 1.5–2.5.

The particulate solid inhibitor may then be mixed with a dispersion or solution of a suitable coating agent as described below in a suitable oil e.g. an aliphatic hydrocarbon such as Isopar M oil. The coating agent may be present in the oil e.g. 1–10% by weight, especially 1–5% or 5–10% (based on total solids). While the solid inhibitor may be comminuted to the desired size before mixing with the dispersion or solution, preferably the inhibitor is comminuted (e.g. to reveal freshly cut surfaces) in the presence of the dispersing agent using any suitable technique, e.g. wet milled, to obtain a suspension of coated inhibitor particles of the required average size e.g. 0.4–10 such as 0.4–1.0 or 1–10 microns. The suspension may then if desired be filtered to obtain coated inhibitor particles. The coating may be continuous or discontinuous and may comprise one or more layers but may be a monolayer. The relative weight of the coating to the solid particle is usually less than 10 g coating dry weight per 100 g of dry weight solid, preferably 0.1–10 g and especially 0.5–5 g. The coating is usually solid. The coating covers at least part of the surface of the particles, such as all of the surface (as with an encapsulating coating on the surface), but preferably only partly covers the surface (as with a non encapsulating coating), e.g. to 25–75% of the total surface area. The coating is preferably discontinuous The coating may be of a dispersing agent, which usually may be substantially water insoluble e.g. e.g. to an extent of less than 0.01% by weight at 20° C. such as polyether or polyamine derivatives or carbon backbone polymers having pendant nitrogen atoms but may be water soluble to an extent of at least 0.1% by weight in distilled water at 20° C. after e.g. 8–15 hours, such as 10–12 hours e.g. carbon backbone polymers having pendant oxygen atoms. The dispersing agent usually may be oil soluble in a liquid aliphatic hydrocarbon of 5–10 carbons to an extent of at least 0.1% by weight in said hydrocarbon; examples of these agents can be polyether or polyamine derivatives. The dispersing agent may be substantially oil insoluble e.g. to an extent of less than 0.01% by weight at 20° C. but is usually oil dispersible; examples of these agents can be carbon backbone polymers having pendant nitrogen and/or oxygen atoms. The dispersing agent is one allowing dispersion of solid inorganic particles in non-aqueous systems, such as liquid hydrocarbons. The dispersing agent is preferably a water in oil emulsifier and advantageously has an HLB value of 1–5 e.g. 2–4. The dispersing agent is preferably oil soluble but water insoluble. The dispersing agent which may be synthetic or naturally occurring, may be polymeric or non-polymeric, among classes of both of which are cationic, non-ionic and anionic compounds. The dispersing agents, especially the polymers, may have both hydrophilic groups, e.g. carboxylic acid, hydroxyl, carboxylic ester and/or nitrogeneous groups such as amides and/or amines and/or imines, and hydrophobic groups, e.g. long chain alkyl groups (e.g. of 8–30 such as 12–24 carbons) in an ester or amide environment. The dispersing agents may have hydrophilic groups, which are anionic cationic, neutral or nonionic. The polymeric dispersing agent may have an organic backbone (e.g. a hydrocarbon backbone) with hydrophilic and hydrophobic side chains, the backbone being polar or preferably hydrophobic e.g. an aliphatic hydrocarbon backbone. The polymeric dispersing agent may have a polar backbone (e.g. with amine groups) and hydrophobic side chains e.g. of fatty acyl groups. The polymeric dispersing agent is usually non elastomeric. The polymeric dispersing agent is usually formed from a hydrophilic group and a non elastomeric hydrophobic group such as one with a polyethylene backbone. Examples of polymeric cationic dispersants are quaternised polyacrylamides, such as the ones available commercially from Nalco and sold under the TradeMark 'Nafloc', while examples of anionic ones are those with carboxylic acid and long chain carboxylic ester groups such as the ones commercially available from ICI and sold under either the Trade Mark 'Hypermer' or the Trade Mark 'Atlox'. The Hypermer/Atlox range of polymers are of the comb type. Comb type polymers have an organic backbone and random or usually periodic hydrophobic groups as comb teeth attached to the backbone. The hydrophobic groups are usually long chain aliphatic hydrocarbyl e.g. of 6–30 carbons, such as alkyl or alkenyl, and are bonded directly or indirectly to the backbone e.g. via a bridging group comprising O, S and/or N containing groups as in ester, amide, ether or thioether groups. Examples of this type of polymer are oligomeric polyesters, for example, oligomeric polyacid polyesters and amine derivatives thereof. Examples of polymeric non-ionic dispersants are described further below, but are primarily in one of three classes, polyether or polyamine derivatives and carbon backbone polymers with pendant oxygen and/or nitrogen groups. Examples of non-polymeric dispersants are surfactants, in general, with more details below and partial esters of a polyol and a fatty acid and naturally occurring phospholipids such as lecithin.

The coating may be of a polymer, in particular a polyether or a polyamine derivative or a carbon backbone polymer with pendant oxygen and/or nitrogen groups.

The coating may also be a copolymer of an ester, which may be formed from a hydroxyl compound and an ethylenically unsaturated carboxylic acid, and a polar ethylenically unsaturated monomer. The ethylenically unsaturated group in the acid may be in the alpha, beta or gamma position or may be at a different location relative to the carboxyl group. Preferred acids have 3–20 carbons, such as 3–12, in particular, alkenoic and aralkenoic acids with 3–6 or 9–12 carbons respectively. Examples of the acids are acrylic, methacrylic, crotonic and cinnamic acids. The hydroxyl compound is usually an alcohol and may be of formula ROH where R is a hydrocarbyl group, preferably an alkyl group, e.g. of 1–30 e.g. 2–30 such as 1–6, 2–6, 7–30 or 8–24 carbons, an alkenyl group e.g. of 2–20 carbons, such as 2–6 or 3–6 carbons, a cycloalkyl group e.g. of 5–8 carbons, an aryl group, e.g. aromatic hydrocarbyl group, such as of 6–20 carbons e.g. 6 carbons or an aralkyl group e.g. of 7–24 carbons e.g. 7 carbons. The alkyl and alkenyl groups may be branched but are preferably linear. Examples of such R groups are methyl, ethyl, n- and iso-propyl, n-, sec-, iso- and tert-butyl, n-, sec-, iso- and tert-amyl and hexyl, octyl, and 2-ethylhexyl, decyl, allyl, cyclohexyl, palmityl, stearyl, phenyl and benzyl. The polar monomer may be, for example, an ethylenically unsaturated carboxylic, sulphonic or phosphonic acid. The ethylenically unsaturated carboxylic acid may be as defined above. The ethylenically unsaturated sulphonic or phosphonic acid may contain 2–20 carbons, especially 2–6 carbons, such as alkenyl acids, e.g. vinyl sulphonic and vinyl phosphonic acid. Examples of such copolymers are ones from (meth) acrylic acid and long alkyl chain (meth)acrylate esters e.g. polyacid polyester dispersants; the copolymers may be as sold by Allied Colloids plc under the Trade Marks DP10-7881 and DP10-7483.

The coating may also be of a surfactant, such as quaternary ammonium surfactants with 1–3 aliphatic groups of at least 6 carbons, especially an alkyl group of 8–20 carbons, and 1–3 organic groups of 1–20 carbons, in particular alkyl groups of 1–6 carbons e.g. methyl or benzyl, such as cetyl trimethyl ammonium bromide, didodecyl dimethyl ammonium bromide or Aliquat 336. The surfactant may also be an alkoxylated quaternary ammonium or an alkoxylated alcohol or phenol or of an oligomer such as ethylene oxide/propylene oxide oligomers or mono- or di-ethers thereof. The HLB value for the surfactant is usually less than 6 e.g. 1–4. Suitably, the coating may be a glycol ether polymer of formula I

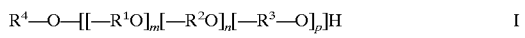

$$R^4—O—[[—R^1O]_m[—R^2O]_n[—R^3—O]_p]H \quad \quad I$$

wherein the —$R^1O$ and —$R^2O$ groups may be in either order attached to the $R^4$—O group, and the $R^3O$ group, if any, is spaced from the $R^4O$ group by the $R^2O$ group and $R^1O$ group, and may be within the definition of $R^1O$ or may be different from the group $R^2O$ or $R^1O$ to which it is bonded directly, $R^4$ is H or an organic group e.g. a hydrocarbyl group or a residue formed by removal of a hydroxyl group from a partial ester of a fatty acid and a polyol e.g. of 2–6 carbons and 2–6 hydroxyl groups, or a siloxane, or an acyl group e.g. from a fatty acid as described below or an optionally substituted residue formed by removal of an hydroxyl group from a phenol-aldehyde resin or wherein the $R^4O$ group is replaced by an $R^{11}NH$ group in which $R^{11}$ represents an organic group of at least 6 carbons, $R^1$ is an ethylene group, each of $R^2$ and $R^3$, which are the same or different is a propylene or butylene group or $R^3$ may be an ethylene group, m is 1–100, n is 0–100, p is 0–5 and the sum of m+n is at least 15.

The group $R^4$ may be an organic group of 1–12 carbons, in particular an organic hydrocarbyl group, as defined above for group R Examples of the alkyl group are methyl, ethyl, propyl, isopropyl, n-butyl, isobutyl, sec butyl, n-amyl, n-hexyl or octyl while examples of the alkenyl group are vinyl, allyl and crotonyl. Examples of cyclo alkyl are cyclopentyl and cyclohexyl, example of aryl are phenyl and alkyl phenyl especially with 1–20, e.g. 6–16 carbons in the alkyl group, such as nonyl-phenyl and examples of aralkyl are benzyl and 2-phenylethyl.

The group $R^4$ may be a siloxane group e.g. the residue formed by removal of a hydroxyl group from a polymeric silanol, such as a poly(dimethylsilox)anol. The polymers may be random or block copolymers.

The group $R^4$ may also be an optionally substituted residue formed by removal of an hydroxyl group from a phenol-aldehyde resin, especially a phenol-formaldehyde resin wherein the substituent in at least one phenolic ring may be at least one of a group $R^{12}$ and a —$SO_3H$ group. $R^{12}$ may be an alkyl group of 1–40 carbon atoms e.g. 1–6 or 10–28 carbons. Examples of the alkyl group are methyl, ethyl, n-hexyl, dodecanyl, lauryl, and stearyl. There may be at least one substituent present in the ring, e.g. 1–4 substituents, preferably 1 or 2 substituents. Where there are 2 or more substituents present these may be the same or different. The substituent may be in any position in the ring but may preferably be in the para position. The phenol aldehyde resin may be a novolac or resole resin. In such glycol ether polymers, n and p are preferably 0.

The organic group $R^4$ may also be a residue formed by removal of a hydroxyl group from a partial ester of a fatty acid and a polyol e.g. of 2–6 carbons and 2–6 hydroxyl groups. The fatty acid may be saturated or unsaturated. The saturated fatty acid is preferably linear, but may be branched (e.g. with a branch methyl group). The acid usually contains 12–40 carbons such as 15–25 carbons, especially 16, 18, 20, 22, or 24 carbons. Examples of suitable acids are lauric, myristic, palmitic, hexadecanoic, stearic, octadecanoic, eicosanoic, docosanoic, tetracosanoic acids.

The unsaturated fatty acid is preferably linear, but may be branched (e.g. with a branch methyl group). It may contain at least one unsaturated group e.g. 1–4 such as 1 or 2 or 3 or 4, especially 1 unsaturated group. The unsaturated group may be alpha, beta, gamma, or in another location, to the carboxylic group or when more than one ethylenically unsaturated group is present, a mixture thereof. The unsaturated group may have a cis or trans configuration or when more than one ethylenically unsaturated group is present each may have a cis or trans configuration; the unsaturated group may be conjugated or non-conjugated, especially separated by 1–3 e.g. 1 carbon atom. The acid usually contains 12–40 carbons such as 15–25 carbons, especially 16, 18, 20, 22, or 24 carbons. Examples of suitable acids are palmitoleic, hexadecenoic, oleic, octadecenoic, eicosenoic, linoleic, and linolenic acids.

The group $R^{11}$ may be an organic group of at least 6 carbons, in particular an organic hydrocarbyl group, as defined above for group R The group $R^1$ is an 1,2-ethylene group. The group $R^2$ or $R^3$ may be a 1,3-propylene or 1,2-propylene (which is preferred) or 1,4-butylene or 1,2-butylene (i.e. 2-ethyl-1,2-ethylene or 1,3-butylene), while $R^3$ may also be a 1,2-ethylene group.

The sum of n, m and n, or m, n and p may be 5–150, in particular 9–100. The average molecular weight of the glycol ether may be 200–15000, such as 1000–12000, in particular 3000–9000.

Examples of suitable polyether glycol polymers of formula (I) are alkylphenol polyethylenoxylates, such as nonylphenol polyethoxylate and ones available commercially and sold under the Trade Mark of Witconol NS108LQ by Witco Corp. USA and Tegopren 7008 by T H Goldschmidt of Germany and non-ionic block copolymers, for example ethylene oxide/propylene oxide oligomers, such as the one sold under the Trade Mark Atlox 4912 by ICI Surfactants. Examples of suitable polyoxyethylene amine derivatives of formula (I) are fatty amine derivatives.

The glycol ether polymer (I) may be a polyethyleneoxylated compound or may be a block or random copolymer. The coating may comprise one of the above polymers or dispersing agents or more than 1 e.g. 1–4 such as 2 or 3. The coating may comprise a mixture of glycol ether polymers of formula (I), which may be demulsifiers, in particular, ones of different type, and preferably a mixture of at least two different polyether glycol polymers of formula (I) selected from polymers wherein i) $R^4$ is H, ii) $R^4$ is an organic group of 1–12 carbons, iii) $R^4$ is a residue formed by removal of a hydroxyl group from an optionally substituted phenol formaldehyde resin and iv) $R^4$ is $R^{11}NH$. Particularly preferred mixtures are those from at least one polymer (iii) or at least one polymer (iv) and at least one polymer (i) or at least one polymer (ii) and preferably wherein at least one polymer is a polyethyleneoxy compound and at least one polymer is a polyethyleneoxy-propyleneoxy compound. Examples of suitable mixtures are oxyalkylated alkylphenol resin and polyoxyalkylated glycols, especially ethyleneoxy/propyleneoxy block copolymers, polyoxyalkylene glycols and oxyalkylated amines or oxyalkylated alkylphenol formaldehyde resins and polyoxyalkylated glycols which are sold as demulsifiers RP 968, RP6150 and RP 6245 by Petrolite Limited The coating may also be of a condensate with structural units derived from i) an aliphatic carboxylic acid of at least 6 carbon atoms, especially a mono carboxylic acid, and ii) a polyamine having at least two amine groups. The carboxylic acid (i) usually has 12–40 carbons such as 15–25 carbons, especially 16, 18, 20, 22 or 24 carbons. The acid may be saturated or unsaturated . The saturated acid is preferably linear, but may be branched (e.g. with a branch methyl group). Examples of suitable acids are lauric, myristic, palmitic, hexadecanoic, stearic, octadecanoic, eicosanoic, docosanoic, tetracosanoic acids. The polyamine usually has at least 2 primary and/or secondary amine groups, especially at least two terminal amine groups, in particular primary amine groups bridged by a carbon chain of e.g. 2–12 carbons, such as an alkylene diamine e.g. ethylene diamine, the carbon chain, optionally and especially preferably interrupted by 1 or more nitrogen atoms in an amine group, such as in a polyalkylene imine, each alkylene group being preferably of e.g. 2–6, especially 2–3 carbons, such as polyethylenimine. The number of amide groups present in the condensate is at least one per molecule and preferably with an average of greater than 1 e.g. 1–4 and the total number of amide groups present in the condensate is usually less than the total number of nitrogen atoms in condensate, the ratio of amide groups to toatal nitrogen atoms being preferably e.g. 1:1.1-4. Examples of preferred condensates are fatty acid polyamine condensates especially fatty acid polyalkylene polyimine condensates; those condensates sold under the Trade Mark 'Atlox LP6' or 'Hypermer LP6' by ICI Surfactants plc England are preferred. Fatty acid polyamine condensates from fatty dicarboxylic acids and polyamines may also be used, e.g. from dicarboxylic acids of 5–20 carbons especially ones with a linear alkylene chain and terminal carboxylic acid group such as hexane 1,6-dicarboxylic acid, and from polyamines such as alkylene diamines and polyalkylene diamines, such as polyalkylene polyimine condensates.

The coating may also be of a polymer having a hydrocarbon backbone with at least one pendant polar group wherein the polar group is oxygen and/or nitrogen containing. The nitrogen containing polar group may be, for example, an N-heterocyclic carbonyl group. The oxygen containing polar group may be, for example, an ester group e.g. an organocarbonyloxy such as a long chain fatty carboxylic ester group and/or an organocarboxyl or carboxy organo group e.g. carboxy methyl group or a hydroxy group.

Thus the polymer may be an aliphatic (N-heterocyclic carbonyl) polymer with a hydrocarbon backbone. Its molecular weight is usually 5000 to 1000000 e.g. 10000 to 1000000 such as 1000 to 50000. The polymer has a hydrocarbon chain with pendant N-heterocyclic carbonyl groups, with the bonding to the chain via the heteroring -N- atom. The carbonyl group may be in any position in the N heteroring, but is especially alpha to the N hetero atom, so the N-heterocyclic rings are preferably derived from lactams, especially of 4–8 e.g. 5 or 6 ring atoms, such as those derived from butyric, pentenoic, pentanoic or hexanoic acid lactams (or 2-pyrrolidone, 2-pyridone, 2-piperidone or omega caprolactam). The aliphatic group or groups in the polymer may be part of the hydrocarbon chain, or bonded to it or to the N-heterocyclic carbonyl ring; the aliphatic group may be linear or branched and maybe alkyl e.g. of 1–40 e.g. 2–25 carbons or alkenyl e.g. of 2–20 carbons, especially methyl, ethyl, butyl or octyl, tetradecyl, hexadecyl, octadecyl, eicosyl, tricosyl or ethylene, butylene or octylene. The molar ratio of aliphatic group to heterocyclic carbonyl group in the polymer is usually 1:99 to 20:80 e.g. 5-15:95-85.

The polymer may be a copolymer having repeat units derived from at least one monomer which is an optionally alkyl substituted vinyl N-heterocyclic carbonyl compound) and at least one monomer which is an olefin; this copolymer may be simple copolymer formed by copolymerization of the monomers or a graft copolymer formed by grafting the olefin onto a polymer of the N-heterocyclic monomer. The polymer may also be an alkylated derivative of a polymer of an optionally alkyl substituted (vinyl N-heterocyclic compound) especially a homopolymer of such a compound.

The optionally alkyl substituted vinyl N-heterocyclic carbonyl compound may be of general formula:

wherein each of $R^8$, $R^6$ and $R^7$, which may be the same or different, represents a hydrogen atom or an alkyl group e.g. of 1–20 carbons, such as methyl, ethyl, butyl, hexyl, decyl or hexadecyl, and $R^5$ represents an N-heterocyclic carbonyl group with the free valency on the N atom; preferably the N heterocyclic carbonyl group is as described above. The N-heterocyclic ring may contain 1–3 ring N atoms but especially 1 ring N atom and 0–2 other ring hetero atoms e.g. 0 or 5, but especially no ring hetero atom; the ring may contain in total 1 or 2 rings, which may be saturated or ethylenically unsaturated such as a pyrrolidine, piperidine, quinoline or pyridine ring. Preferably $R^6$, $R^7$ and $R^8$ are hydrogen and $R^5$ represents an N-(pyrrolidone), N-(2 pyrid-2-one) or N-(piperid-2-one) group.

The olefin is usually of 2–32 e.g. 4–18 carbon atoms and is generally a hydrocarbon. It is preferably an alkene, especially a linear alkene and has in particular a terminal olefin group. It is preferably a vinyl olefin e.g. of formula $CH_2=CH-R^9$, where $R^9$ is hydrogen or alkyl of 1–40 carbons, such as methyl, ethyl, propyl, butyl, hexyl or decyl, tetra decyl, octadecyl or octacosyl (so the olefin is tricosene). The olefin is preferably butylene octene-1 or dodecene-1, hexa decene-1, octadecene-1, eicosene-1 or tricosene-1.

The polymer may also be a homo or copolymer of an alkyl substituted N-(alkenyl) heterocyclic compound in which the alkyl substitutuent may be in the N-heteroring and/or present in the alkenyl side chain; the alkyl substituent may be as is preferred for the aliphatic group on the polymer described above. The polymer may have structural units from an N-vinyl-alkyl ring substituted heterocyclic carbonyl compound, such as N-vinyl-3-methyl pyrrolid-2-one and/or from an N-butenyl-heterocycle carbonyl compound, such as N-butenyl-pyrrolid-2-one.

Preferred polymers of this type are aliphatic (N-heterocyclic carbonyl) polymers with units derived from N-vinyl pyrrolid-2-one and butylene, octylene, dodecylene, hexadecylene (sold as Antaron V216), eicosylene (sold as Antaron V220) and tricosylene; the Antaron products are sold by International Speciality Products of Wayne, N.J., USA The coating may also be of an aliphatic polymer having a hydrocarbon backbone with at least one pendant oxygen containing group with bonding of the backbone chain directly to an oxygen atom of the group. The group may be, for example an organooxy carbonyl or organo carboxyl function or a hydroxy function or especially both of the latter. Examples of suitable organo carboxyl groups are ones derived from an acid of formula $R^{10}C$ O2H where $R^{10}$ is as defined above for group R, especially derived from acetic acid. Thus the polymer may be of a monomer (1) with structural units from vinyl carboxylate esters such as vinyl acetate or vinyl propionate, and optionally at least one monomer (2) which is a monomer with structural units from 'vinyl alcohol'. Its molecular weight may be 5000 to 1000000 e.g. 10000 to 1000000 such as 12000 to 200000. Examples of such polymers are polyvinyl acetate and poly (vinyl acetate-co-vinyl alcohol), such as partly hydrolysed polyvinyl acetate.

The polymer may also comprise structural units from a monomer (2) reacted with an aldehyde, especially an aliphatic aldehyde of 2–18 e.g. 2–6 carbons, such as acetaldehyde or butyraldehyde or an aromatic aldehyde e.g of 7–10 carbons, such as benzaldehyde. Its molecular weight, (especially Weight Average Molecular weight), may be 5000 to 1000000 e.g 10000 to 1000000 such as 12000 to 200000. Examples of suitable polymers are polyvinyl butryral polyvinyl alcohol copolymers sold by Polysciences Inc.

The coating may also be of a naturally occurring phospholipid, such as that derived from soya bean oil. The phospholipid may be substantially pure, but may be used as a mixture with glycerides. An example of such a phospholipid is lecithin.

Of the above types of coating preferred are polymeric ones, in particular polyethers, especially non-ionic block copolymers and polyether siloxanes, polyamines, especially fatty acid polyamine condensates and also polymers with a hydrocarbon backbone and pendant nitrogen or pendant oxygen as further described above.

The coating on the particles comprises dispersing agent which may or may not be a surfactant and which may be monomeric or preferably polymeric; especially the coating consists substantially of the dispersing agent in particular of the polymeric dispersing agent. However if desired the coating may comprise dispersing agent, and also a non dispersant solid polymer (e.g. in relative weight ratio 50-99:50-1 e.g. 80-95:20-5). Combinations of the dispersing agent and the polar oil field chemical are preferably used which are not of the same charge, i.e. are of different charges, or one may be charged and the other may be nonionic; Thus anionic oil field chemicals e.g. carboxylic acid polymers (in acid or salt form) preferably have a coating of cationic or basic dispersing agent or nonionic agent, while cationic oil field chemicals e.g. cationic corrosion inhibitors preferably have a coating of anionic or nonionic agent. Especially important are combinations in which the dispersing agent and polar oil field chemical have opposed charges e.g. anionic oil field chemicals and basic or cationic dispersing agents.

The coating may be applied to the inhibitor particles by any suitable method. Depending on the method of coating employed the inhibitor particles may be obtained either as a wet or dry coated product i.e. obtained, respectively, in the presence or absence of a liquid diluent. Methods of obtaining a dry coated product include applying a solution of the coating agent to a spray-dried, pre-comminuted, for example, a pre-ball-milled inhibitor or applying a solution of the coating agent to a spray-dried inhibitor, followed by comminuting, for example, ball-milling. Methods of obtaining a wet product include adding a solution of a coating agent to the inhibitor particles whilst wet-milling the particles. The wet-milling may be carried out in the presence of an oil, for example, diesel oil or kerosene. The contact of the particles of oil field production chemical and the polymer or dispersing agent causes the polymer or dispersing agent to adhere to at least part of the surface of the particle.

The coated solid oil field chemical e.g. inhibitor may be isolated from its production medium before dispersion in an oil for use, unless it is made in that oil in which case it may be used without isolation. Thus preferably the particles are coated by comminution in a solution or dispersion of the dispersing agent in an oil to produce a dispersion of the coated particles in the oil medium containing the dispersing agent; the proportion of solid particles, dispersing agent and oils is usually such that the dispersion of coated particles produced usually contains 10–40% e.g. 20–30% of solids.

For use the chemical e.g. inhibitor is present as a dispersion in an oil which may be a liquid hydrocarbon, for example, diesel oil or kerosene. The concentration of coated chemicals e.g. inhibitor in the oil is usually 10–50%, preferably 20–30%. The coated chemicals e.g. inhibitor is usually sold as a concentrated suspension in the oil, ready for dilution prior to use e.g. with diesel oil and preferably to 0.1–1% of the chemical e.g. inhibitor.

The coated chemicals e.g. inhibitor provides controlled release of the chemical e.g. inhibitor into the formation and/or the produced fluids. Controlled release is advantageous in that it extends the lifetime of the chemical e.g. inhibitor and reduces the number of treatments required. Consequently production downtime and chemical costs are reduced.

The use of the coated inhibitors will be illustrated further with respect to scale inhibitors but is applicable in a similar way for other inhibitors, or other oil field chemicals.

The coated scale inhibitor of the present invention is usually injected into a formation under pressure, preferably via a production well-bore, and especially after a pre-flush e.g. of diesel, and preferably with a post-flush of hydrocarbonoil e.g. diesel and then optionally water e.g. sea water.

The well-bore is then preferably shut-in for 2–50 hours, for example, 5–15 hours. The scale inhibitor particles are believed to become trapped in the formation matrix and then subsequently dissolve at a reduced rate into the fluids present in the formation and the produced fluids produced therefrom. After shut-in the production well is returned on-stream. Compared to an aqueous based scale inhibitor the oil based inhibitor suspension of the present invention allows the well to be returned to full production more quickly and stay there for longer. The production fluids may be analysed e.g at the surface in the produced fluid or preferably in any produced water separated from that fluid, to monitor the inhibitor concentration to determine the need for further scale inhibitor treatments. The concentration of inhibitor present in the production fluids may be 1–5000 ppm e.g. 1–200 ppm such as 5–50 ppm.

The invention is also applicable to other oil field production chemicals, which reduce the formation of a separate phase from a liquid phase in a subterranean environment producing oil, such as those which reduce solid deposits or solid growths of e.g scale or wax or asphaltenes or corrosion, such as scale inhibitors or wax inhibitors or asphaltene inhibitors or corrosion inhibitors, or which remove said separate phase, e.g. which remove gas from oil, such as in foams, or break liquid mixtures, such as emulsions e.g demulsifiers.

Examples of corrosion inhibitors are compounds for inhibiting corrosion on steel, especially in anaerobic conditions, and may especially be film formers capable of being deposited as a film on a metal e.g. a steel surface such as a pipeline wall. Such compounds may be cationic surfactants especially quaternary ammonium salts, which contain at least one hydrophobic group, usually an alkyl group of 8–24 carbons such as 12–18 carbons, e.g. lauryl, cetyl or stearyl, or an aromatic hydrocarbyl group e.g. an (optionally alkyl substituted) benzyl or phenyl group such as 8–20 carbon alkyl substituted aromatic e.g. dodecylbenzyl and $C_{12-16}$ alkyl benzyl. There may be 1 or 2 such hydrophobic groups which may be the same or different, the other 3 or 2 groups bonded to nitrogen in the quaternary salt being organic especially hydrocarbyl, in particular of 1–7 carbon atoms, such as alkyl or alkenyl, in particular methyl, ethyl, propyl or butyl. The salts are water soluble, in particular halides such as chloride or bromide or sulphate or nitrate. Examples of cationic surfactants are benzyl alkyl dimethyl ammonium chloride and benzalkonium chloride and cetyl trimethyl ammonium bromide. In other cationic surfactants in addition to the hydrophobic group the quaternised nitrogen atom may be part of a saturated or unsaturated heterocyclic ring e.g. of 5–7 ring atoms, such as a pyridine, quinoline, or piperidine ring; there may be 1 or 2 ring N atoms in 1 or 2 heterocyclic rings, which may be fused to an aromatic or cycloaliphatic ring. In addition to the hydrophobic and N heterocyclic groups any remaining valencies on the nitrogen can be satisfied with organic groups e.g. of 1–7 carbons such as alkyl of 1–5 carbons, especially methyl or ethyl. An example of such a heterocyclic cationic is cetylpyridinium chloride. In addition to cationic surfactants other types of surfactant may be used, for example, non quaternised long aliphatic chain hydrocarbyl N-heterocyclic compounds, where the aliphatic hydrocarbyl group may be as defined for the hydrophobic group above; mono or diethylenically unsaturated aliphatic groups e.g. of 8–24 carbons such as oleyl are preferred. The N heterocyclic group can have 1–3 rings N atoms with 5–7 ring atoms in each ring; imidazole and imidazoline rings are preferred. The ring may also have an amino alkyl e.g. 2-aminoethyl or hydroxyalkyl e.g. 2-hydroxyethyl substituent. Oleyl imidazoline may be used.

The asphaltene inhibitor may be an amphoteric fatty acid or a salt of an alkyl succinate while the wax inhibitor may be a polymer such as an olefin polymer e.g. polyethylene or a copolymeric ester, e.g. ethylene vinyl acetate copolymer, and the wax dispersant may be a polyamide. The hydrogen sulphide scavenger may be an oxidant, such as an inorganic peroxide, e.g. sodium peroxide, or chlorine dioxide, or an aldehyde e.g. of 1–10 carbons such as formaldehyde or glutaraldehyde or (meth)acrolein.

The coated products of the invention, especially the coated scale inhibitor, are usually suitable for use in most reservoirs, especially water sensitive ones, in particular ones where the pressure in the oil bearing formation significantly reduces the oil production rate or low pressure reservoirs where the water and oil are at significantly different pressures.

The suspensions of the invention may also comprise other suitable additives such as organophilic thickening agents or viscosifiers e.g of the swelling type or the non-swelling type such as natural or synthetic polymers e.g ethyl cellulose or modified natural minerals such as hydrophobic smectite clays, e.g bentonite or synthetic clays e.g modified silica such as organophilic fused silica such as Aerosil R972. Optionally a gelling agent, such as propylene carbonate may be used with the thickening agent or viscosifier.

The invention is illustrated in the following Examples, in which the coating polymers were used as received from the manufacturers, i.e. in oil dispersible media.

EXAMPLE 1

A scale inhibitor was obtained as a 40% by weight solution (pH of 6) of a sodium salt of polyvinyl sulphonate polyacrylic acid copolymer sold as CALNOX ML3263 by Baker Chemicals. The solution was spray-dried to give solid particles of greater than 5 microns in size. The particles were ball-milled, wet with ISOPAR oil in the presence of 2% by weight (based on total solids) of a HYPERMER LP6 comb-type polymer sold by ICI to produce a thick suspension of 26.8% by weight of solids. If desired the suspension may be filtered to leave coated particles. Preferably for use the suspension was diluted to 2.5% by weight solids with odourless kerosene.

EXAMPLE 2

The efficiency of the scale inhibitor prepared in Example 1 in inhibiting deposition of scale was determined by the following procedure and compared (at constant copolymer weight percentage) to use of a comparable weight percentage of the aqueous scale inhibitor solution of Example 1.

Preserved core from a North Sea well was cut into plugs. Each plug was loaded into the inner tube of a coreflood apparatus comprising a pair of concentric pressurised tubes sealable at both ends through which a liquid may be passed in either direction. The tubes were then pressurised at ambient temperature at $1.03 \times 10^7$ $Nm^{-2}$ (1500 psi) for the annulus between the tubes (gross overburden pressure) and $3.45 \times 10^6$ $Nm^{-2}$ (500 psi) pressure for the core (pore pressure).

The core was then saturated with kerosene by flowing at least 20 pore volumes over 24 hours. It was then flushed to reduce its water content to the Swi (saturation water) level using kerosene at an injection rate of 10 mls/mn in both flow directions. The coreholder comprising the pair of tubes and inlet and outlet flow lines were then heated to 115° C.

The plug was treated with at least 5 pore volumes of crude oil in the reverse flow direction until steady-state conditions of constant pressure drop for a given flow rate were achieved. During this stage the crude oil was filtered through a 0.45 micrometer filter immediately upstream of the sample.

The plug was shut-in for 24 hours at 115° C. and thereafter all operations on the plug were at this temperature.

A low flow rate waterflood was then carried out on each core by injection of seawater (pH 5.5) at 4 mls/hour in the forward flow direction for about 72 hours. The total flood volume was about 14.5 pore volumes in each case.

This slow rate water flood was followed by a faster rate (30 mls/hour) 'flood' carried out using seawater in the same flow direction. This ensured that any permeability change resulting from treatment of the sample with scale inhibitor was not masked by any increase in relative permeability to water resulting from additional mobilisation of oil at the higher flow rate.

Eight pore volumes (162 mls in total) of the diluted suspension of scale inhibitor (or for comparison a 2.5% wt aqueous solution of the copolymer) were injected into the test plug at 30 mls/hour in the reverse flow direction.

The treated plug was then shut-in for 13 hours.

Inhibitor was flushed from the feed and exit lines using seawater. A bypass line around the coreholder permitted removal of most of each medium comprising inhibitor from these lines. However, a dead volume of about 0.4 mls remained immediately upstream and downstream of the plug, retained by the core holder's end-pieces. The total unflushed volume was therefore 0.8 mls.

Each inhibitor was then eluted from the sample with seawater (pH 5.5) at 30 mls/hour in the forward flow direction, collecting 0.2 pore volume fractions (4 mls) for the first 10 pore volumes, 10 mls fractions for the next 100 pore volumes and 15 mls fractions for the final 100 pore volumes. A total of 4.2 liters of seawater was used to elute each plug.

In respect of each of the pores treated with the aqueous inhibitor and with the inhibitor suspension, the concentration of scale inhibitor in the effluent water from the core was analysed as a function of eluate expressed in pore volumes. The results are shown in Table 1.

TABLE 1

| Postflush pore volumes/ conc (ppm) | 10 | 30 | 40 | 50 | 55 | 100 | 150 | 200 | 225 |
|---|---|---|---|---|---|---|---|---|---|
| Inhibitor | 69 | 13.2 | 7.6 | 4.2 | 1 | | | | |
| Invention | 481 | 52 | 48 | 54 | 54 | 54 | 21 | 11.7 | 11 |

EXAMPLES 3–11

In the following Examples particles of the scale inhibitor used in Example 1 were in all cases except Examples 3 and 11, treated with different polymers from those in Example 1. Examples 3 and 11 were treated with the same polymer as in Example 1. Suspensions in oil of the treated particles were tested for their rate of release of the scale inhibitor as a simple simulation of the rate of release in a downhole formation.

The polymers and their natures were as described below in Table 2.

TABLE 2

| Example | Polymer | Type |
|---|---|---|
| A | None | |
| 3 | Hypermer LP6 | Polyamine/fatty acid condensate |
| 4 | Tegopren 7008 | Polyether modified siloxane |
| 5 | Antaron V216 | Polyvinyl pyrrolidone/hexadecene copolymer |
| 6 | Atlox 4912 | Non ionic block copolymer |
| 7 | Hypermer D477 | Polymeric surfactant |
| 8 | DP10-7881 (sold by Allied Colloids) | Acrylic polymer |
| 9 | DP10-7483 (sold by Allied Colloids) | Acrylic polymer |
| 10 | Polyvinylbutyral/ vinylalcohol | |
| 11 | Hypermer LP6 | Polyamine/fatty acid condensate |

Suspensions of the scale inhibitor with each polymer in Isopar M paraffin oil were made in weight proportions 10.0:2.5:87.5. The scale inhibitor had been previously spray dried in a pilot plant and then air milled in all cases but Example 11, for which final milling had been in a DynaMill to give a lower particle size. In each case, except Example 11, the suspension was made by mixing the ingredients in a bead mill for 30 minutes to produce a low viscosity opaque suspension. In Example 11 the spray dried scale inhibitor, polymer and Isopar M oil were mixed in a bead mill for 30 minutes and the resulting suspension decanted. The decanted solids (46% w/w) were then mixed in a bead mill with additional Isopar M oil (49.5% w/w) and an organic derivative of a smectite sold under the Trade Mark 'Bentone 34' by RHEOX Inc (3.4% w/w) until uniform at which point propylene carbonate (1.1% w/w) was added and milling continued until all of the clay Bentone 34 had dispersed to produce a low viscosity opaque suspension. The particle sizes of the particles in the suspension were determined using a laser particle analyzer and are shown in Table 3.

TABLE 3

| | | Particle Size/microns | | | |
|---|---|---|---|---|---|
| Example | Number Mean (nv) | Volume Mean (vm) | Median | 95%< | 100%< |
| A | 1.9 | 3.8 | 3.6 | 7.4 | 11.0 |
| 3 | 1.9 | 3.8 | 3.6 | 6.9 | 8.0 |
| 4 | 1.5 | 3.3 | 3.3 | N/A | 7.0 |
| 5 | 1.9 | 3.7 | 3.9 | N/A | 8.0 |
| 6 | 1.5 | 3.1 | 2.7 | 6.5 | 8.5 |
| 7 | 1.6 | 3.0 | 2.9 | 5.5 | 6.0 |
| 8 | 1.8 | 3.5 | 3.6 | N/A | 7.0 |
| 9 | 1.9 | 3.7 | 3.7 | N/A | 7.0 |
| 10 | 1.5 | 4.9 | 4.8 | 8.8 | 10.0 |
| 11 | 1.1 | 2.0 | 1.5 | N/A | 5.0 |

The ability of the particles to release the scale inhibitor into water was tested as follows:

Release Rate Testing

A 500 ml glass container with screw cap was filled with 400 ml of tap water and a submerged sampling tube fitted through a hole in the cap. The submerged end of the sampling tube rested at the container's base and samples (6 mls) withdrawn using a disposable syringe that was washed with tap water after each sampling. Sufficient of each scale inhibitor suspension was added to give a theoretical maximum concentration of approximately 100 ppm in the water. The container was secured in a flask shaker, the lid replaced and gentle agitation begun. The rate of shaking was such that the surface of the water was not grossly disturbed. Agitation was briefly halted for sampling.

The experiments were repeated, with blanks which were mixtures of the Polymer 2.5 parts and Isopar Oil 97.5 parts to ensure that the Polymer did not interfere with the assay for the scale inhibitor. The Polymer release rate analysis of the blanks indicated that there was no interference from any of the Polymers. The samples were analysed for scale inhibitor content as described below.

Assay Method

A 5 ml sample of aqueous sample solution from the release testing was taken and 5 ml of a 5% solution of citric acid (trisodium salt dihydrate) in distilled water was added, followed by 10 ml of distilled water and 5 ml of a 5000 ppm solution of benzethonium chloride, a cationic surfactant sold as Hyamine 1622 in distilled water. The mixture was vigorously shaken and then allowed to stand at room temperature for 40 minutes (+/−1 minute). A portion of the sample was transferred to a 10 mm path length cuvette and the absorbence measured using a Philips PU8620 spectrophotometer at a wavelength of 500 nm.

A calibration was performed and the response found to be linear between 15 and 100 ppm scale inhibitor concentration.

| Time/hrs | | Inhibitor Concentration/ppm | | | |
|---|---|---|---|---|---|
| Example | A | 3 | 4 | 5 | 6 | 7 |
| 0.5 | 78 | 18 | <15 | 16 | <15 | <15 |
| 1 | 81 | 26 | <15 | 16 | <15 | <15 |
| 2 | 85 | 42 | <15 | 17 | <15 | <15 |
| 3 | 82 | 65 | <15 | 18 | <15 | <15 |
| 4 | | 80 | <15 | 22 | <15 | <15 |
| 5 | | >100 | <15 | 29 | <15 | <15 |
| 6 | | >100 | <15 | 35 | <15 | <15 |

-continued

| Time/hrs | Inhibitor Concentration/ppm | | | | |
|---|---|---|---|---|---|
| Example | A | 3 | 4 | 5 | 6 | 7 |
| 7 | | N/A | <15 | 72 | <15 | 25 |
| 24 | | >100 | >100 | 88 | N/A | >100 |

| Time/hours | Inhibitor Concentration/ppm | | | |
|---|---|---|---|---|
| Example | 8 | 9 | 10 | 11 |
| 0.5 | <15 | <15 | 25 | 25 |
| 1 | <15 | <15 | 31 | 27 |
| 2 | <15 | <15 | 40 | 25 |
| 3 | <15 | <15 | 44 | 26 |
| 4 | <15 | <15 | 59 | 29 |
| 5 | <15 | <15 | 54 | 25 |
| 6 | <15 | <15 | 65 | 26 |
| 7 | <15 | <15 | 81 | 33 |
| 24 | >100 | >100 | >100 | 64 |

Example 12

A field trial was performed to test the coated particles of the invention.

According to the method of Example 1 were made spray dried particles of the scale inhibitor of Example 1 which were then ball milled wet with the oil ISOPAR to an average of 0.75 micron particle size in the presence of 6% by weight of the HYPERMER LP6 comb polymer to produce a thick suspension of 25% of the solids. The suspension was diluted with diesel oil to give a diluted suspension containing 0.25% of the inhibitor (by weight).

A North sea oil well was tested before and after the trial for its properties. Before the trial, total produced liquid production rate was 19774 barrels/day (bbls/day) with the liquid containing 98% water and 2% oil, and an injection pressure of up to 1750 psi during injection of 420 bbl of sea water at 4.5 bbl per min.

The well was then pre-flushed with 50 bbl of diesel at 2.2 and then 5.2 bbl per min.

The dilute suspension of the coated inhibitor was then continuously mixed with diesel using 800 liters of the former to 500 barrels of diesel to give a test mixture which was pumped into the formation at 4–4.5 bbls per min. During the injection the pressure rose from 1250 to 1750 psi.

After injection of the test mixture 90 bbls of diesel were injected as a post-flush treatment follows by 222 bbls of sea water over flush, both at 4 bbls per min.

12 hrs later production was restarted; the production rate was 20026 bbls per day. The production fluids were sampled regularly thereafter. There was no significant emulsion production nor any initial increase in oil in water content.

The results show that the suspension was injected into the formation without blocking the pores (same pressure increase with the suspension as with the sea water), the production rate was not affected and the inhibitor was retained in the formation (immediate return of inhibitor would have resulted in strong emulsion formation on restart of production which was not seen).

The production fluids were analysed for the scale inhibitor over the next 54 hours after the restart of production. After 1 hr 10 min with 216 bbls fluids produced the concentration of inhibitor was 2150 ppm, which level decreased at a progressively reducing rate to 773 ppm with 402 bbls fluids passed, 74 ppm with 1729 bbls fluid, 28 ppm with 3035 bbls fluid, 14 ppm at 8105 and 13 ppm at 12200 bbls fluid.

We claim:

1. A process for the manufacture of particles of an oil field production chemical, comprising comminuting a solid particulate oil field production chemical in the presence of a dispersion of a dispersing agent in an inert oil to cause the dispersing agent to adhere to at least part of the surface of the particle to form a coating on said particle, the weight of coating to said particles being 0.1–10% and wherein the coated particles have an average size of less than 20 microns.

2. A process as claimed in claim 1 wherein the dispersing agent adheres to part of the surface of the particle to form a discontinuous coating.

3. A process as claimed in claim 1 wherein the dispersing agent is selected from
   a) a comb type polymer;
   b) a polymer of an oligomeric polyacid polyester or amine derivative thereof;
   c) a surfactant; and
   d) a polymer comprising a hydrocarbon backbone with at least one pendant oxygen and/or nitrogen containing polar group.

4. A process as claimed in claim 3 wherein the surfactant is a polymeric or monomeric alkoxylated alcohol or phenol.

5. A process as claimed in 3 wherein the surfactant is a polymeric ether.

6. A process as claimed in claim 3 wherein the polymer comprising a hydrocarbon backbone with at least one pendant oxygen and/or nitrogen containing polar group is an aliphatic (N-heterocyclic) carbonyl polymer.

7. A process as claimed in claim 6 wherein the aliphatic (N-heterocyclic) carbonyl polymer is an alkylated derivative of polyvinylpyrrolidone.

8. A process as claimed in claim 3 wherein the coating comprises a fatty acid polyamine condensate.

9. A process as claimed in claim 1 wherein the oil field production chemical is a scale inhibitor, a corrosion inhibitor, an asphaltene inhibitor, a wax inhibitor or a demulsifier.

10. A process as claimed in claim 9 wherein the scale inhibitor is a polymeric compound.

11. A process as claimed in claim 10 wherein the polymeric compound is a polyvinyl sulphonic acid, a poly(meth) acrylic acid or a copolymer of a vinylsulphonic acid and a (meth)acrylic acid or an alkali metal salt thereof.

12. A process as claimed in claim 1 wherein the coated particles have an average particle size of between 0.4 and 10 microns.

13. A process as claimed in claim 12 wherein the coated particles have an average particle size of between 1 and 10 microns.

14. A process as claimed in claim 13 wherein the coated particles have an average particle size of between 1 and 3 microns.

15. A process as claimed in claim 1 wherein the coated particles have particle size of 100% less than 10 microns.

16. A process as claimed in claim 15 wherein the coated particles have a particle size of 100% less than 5 microns.

* * * * *